S. SIMON.
COMBINED CUTTER AND CHOPPER.
APPLICATION FILED APR. 16, 1915.

1,155,843.

Patented Oct. 5, 1915.

Inventor
S. Simon

By A. W. Wilson
Attorney

UNITED STATES PATENT OFFICE.

STEVEN SIMON, OF MUSKEGON HEIGHTS, MICHIGAN.

COMBINED CUTTER AND CHOPPER.

1,155,843.          Specification of Letters Patent.          Patented Oct. 5, 1915.

Application filed April 16, 1915. Serial No. 21,779.

*To all whom it may concern:*

Be it known that I, STEVEN SIMON, subject of the King of Hungary, residing at Muskegon Heights, in the county of Muskegon and State of Michigan, have invented certain new and useful Improvements in Combined Cutters and Choppers, of which the following is a specification.

This invention relates to certain new and useful improvements in combined cutter and chopper.

The primary object of this invention is to provide a cutting implement having interchangeable blades and being adjustable in length especially designed for cutting rectangular openings by chopping operations.

A further object of the invention is to provide a hand cutter having a variable number of toothed semi-circular cutting blades arranged in pairs and having a locking engagement with shiftably mounted operating handles.

A still further object is to provide a chopping implement that is cheap and easy to manufacture and has interchangeable pairs of cutting blades adapted to be assembled in a rigid compact manner in an extremely strong construction.

With these general objects in view and others that will appear as the nature of the invention is better understood, the same consists in the novel combination and arrangement of parts hereinafter more fully described, illustrated in the accompanying drawings, and pointed out in the appended claims.

Figure 1:
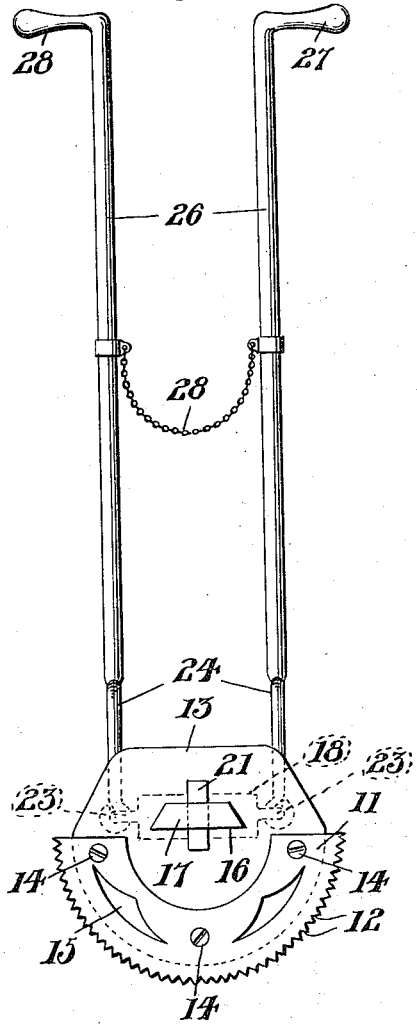
Figure 2:
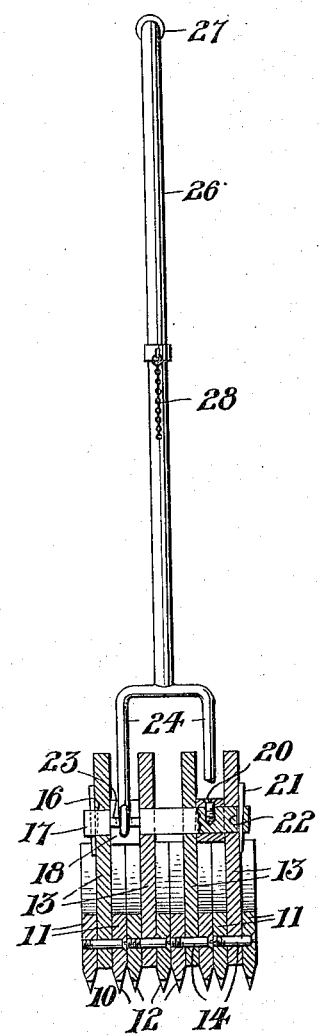
Figure 3:
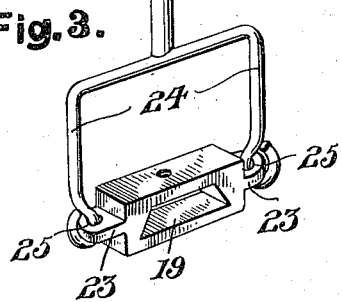
Figure 4:
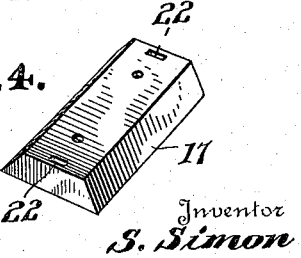

In the drawings forming a part of this application and in which like-designating characters refer to corresponding parts throughout the several views, Figure 1 is a side elevation of the device. Fig. 2 is a central longitudinal sectional view thereof, the mid part of block 17 and one fork of the handle and the end of casing block 18 being shown in elevation. Fig. 3 is a perspective view of one of the handle mounting means, and Fig. 4 is a perspective view of the locking block detached.

It often being desirable to cut square or rectangular openings through planks and other objects, such as ice formations, the present device is constructed for that purpose and comprises a plurality of cutting units 10 adapted to be assembled together in the manner illustrated in Figs. 1 and 2 and in which views four of such units are shown operatively positioned, it being understood that a larger number of units may be employed if desired.

It is to be understood that the proportions of the device herein illustrated may be varied as desired so that the edges of the blades used for the cutting or rasping operation may project to such an extent as will enable the device to be properly used.

Each of the units 10 consists of substantially semi-circular cutting blades 11 having tapered toothed cutting edges 12 and being secured in juxta-position upon opposite sides of a mounting plate 13. Screws 14 are positioned through the blades and intervening plate of each unit, while cut-away portions 15 are provided in the blades for lightness.

The plates 13 are provided with transverse quadrilateral openings 16 therethrough adapted to be positioned in alinement with each other when the units are assembled and so as to receive the locking block 17 slidably positioned therethrough.

Casing blocks 18 are provided rectangular in cross section and being of a thickness corresponding to two of the blades 11 so as to closely fit between any adjacent plates 13 and having perforations 19 therethrough of the same shape and size as the plate openings 16 and through which the locking block 17 is positioned. The block 17 is provided of the required length for receiving the desired number of cutting units 10 and as best illustrated in Fig. 2, the units being assembled together with the block 17 arranged through the openings 16 thereof and also through the perforations 19 of the two casing blocks 18, the block is retained in position by means of set screws 20 carried by the casing blocks and screwed into the locking block and also by means of cotters or wedges 21 removably positioned within slots 22 adjacent the opposite ends of the locking block.

The casing blocks 18 are provided with perforated lugs 23 at their opposite ends and handle bails 24 are pivotally mounted within the perforations 25 of the said lugs, while the operating shanks 26 project centrally from the said bails. Terminal handles 27 are provided upon the shanks 26, while a connecting chain 28 is arranged between the shanks 26 for limiting the distance to which the same may be separated.

With the device assembled as herein illustrated, the operator may readily grasp the same by means of the handles 27, and by oppositely reciprocating the handles 27 and 28 may rock the tool on the surface to be cut and can readily cut a rectangular opening in the ice or wooden member by means of the rasping effect of the sharp teeth 12 of the semi-circular cutting blades 11. It will also be evident that the length of the instrument depends upon the length of the locking block 17 that is employed and the number of cutting units 10 that are supplied thereon. The separate blades 11 may be also removed from the blades 13 and readily replaced by means of the securing screws 14, while the shiftable arrangement of the operating handles allows the operator to slightly tilt the blades when found desirable during the cutting operation.

It is to be understood that the projection of the plates 11 from the plates 13 may be varied so that when these plates 13 are brought to bear against the surface the projected portions of the cutting plates or blades will be sufficient to penetrate the desired thickness. It will also be understood that in the operation of cutting such material as ice the rocking motion will not always take place in exactly the same lines but owing to the brittleness of the ice the entire tool may be caused to penetrate through the ice since the rasping effect will be produced along different lines as the head moves slightly from its original position, either laterally or angularly.

While the form of the invention herein shown and described is what is believed to be the preferred embodiment thereof, it is nevertheless to be understood that minor changes may be made without departing from the spirit and scope of the invention as claimed.

What I claim as new is:—

1. A cutter comprising spaced bars, of semi-circular cutting blades having sharpened edge teeth, mounting plates removably secured between the members of each pair of blades and having alined openings therethrough, casing blocks of a width equal to the thickness of two of the said blades and positioned between adjacent ones of the said plates and having perforations therethrough in alinement with the said plate openings, a locking block slidably positioned through the said perforations and openings, and operating handles pivoted to the said bars.

2. A cutter comprising spaced bars, of semi-circular cutting blades having sharpened edge teeth, mounting plates removably secured between the members of each pair of blades and having alined openings therethrough, casing blocks of a width equal to the thickness of two of the said blades and positioned between adjacent ones of the said plates and having perforations therethrough in alinement with the said plate openings, a locking block slidably positioned through the said perforations and openings, perforated lugs upon the opposite ends of the said bars, set screw connections between the said bars and block, locking cotter pins carried adjacent the opposite ends of the said block, bails pivoted to the said bar lugs, operating handles centrally attached to the said bails, and a limiting chain connected between the said handles.

In testimony whereof I affix my signature.

STEVEN SIMON.

Witnesses:
ALEX. VAN ZANTLE,
JULIUS LASCKO.